United States Patent
Corrie et al.

(10) Patent No.: US 10,310,878 B2
(45) Date of Patent: Jun. 4, 2019

(54) EXECUTION OF AN APPLICATION IN A RUNTIME ENVIRONMENT INSTALLED IN A VIRTUAL APPLIANCE

(71) Applicant: VMware, Inc., Palo Alto, CA (US)

(72) Inventors: Benjamin J. Corrie, San Francisco, CA (US); Richard McDougall, Menlo Park, CA (US); Michal Ostrowski, Cedar Park, TX (US)

(73) Assignee: VMware, Inc., Palo Alto, CA (US)

( * ) Notice: Subject to any disclaimer, the term of this patent is extended or adjusted under 35 U.S.C. 154(b) by 1435 days.

(21) Appl. No.: 13/717,130

(22) Filed: Dec. 17, 2012

(65) Prior Publication Data

US 2013/0167147 A1 Jun. 27, 2013

Related U.S. Application Data

(60) Provisional application No. 61/576,692, filed on Dec. 16, 2011.

(51) Int. Cl.
  *G06F 9/455* (2018.01)
  *G06F 8/60* (2018.01)

(52) U.S. Cl.
  CPC ...... *G06F 9/45533* (2013.01); *G06F 9/45558* (2013.01); *G06F 8/60* (2013.01); *G06F 2009/45583* (2013.01)

(58) Field of Classification Search
  CPC .... G06F 9/45533; G06F 9/45558; G06F 8/60; G06F 2009/45583
  See application file for complete search history.

(56) References Cited

U.S. PATENT DOCUMENTS

| | | | | |
|---|---|---|---|---|
| 7,577,722 B1* | 8/2009 | Khandekar et al. | | 709/220 |
| 7,971,182 B1* | 6/2011 | Vlaovic | | G06F 8/71 717/104 |
| 9,189,257 B2* | 11/2015 | Colyer | | G06F 9/44505 |
| 2002/0026474 A1* | 2/2002 | Wang | | G06F 9/445 709/203 |
| 2003/0023661 A1* | 1/2003 | Clohessy | | G06F 9/5016 718/104 |
| 2008/0126785 A1* | 5/2008 | Chong | | G06F 9/4401 713/2 |
| 2009/0070776 A1* | 3/2009 | Dahlstedt | | G06F 9/5016 719/312 |
| 2009/0313620 A1* | 12/2009 | Sedukhin | | G06F 8/61 718/1 |
| 2010/0011357 A1* | 1/2010 | Ramamurthy | | 718/1 |

* cited by examiner

*Primary Examiner* — Bing Zhao
(74) *Attorney, Agent, or Firm* — Patterson + Sheridan, LLP

(57) ABSTRACT

Methods, systems, and computer programs for providing an application server appliance utilizing one or more virtual machines are described. The application server appliance may be a virtual machine having a reduced guest operating system, a runtime environment, and a management agent installed therein. An appliance controller automatically determines one or more configurations and/or settings for the runtime environment based on a variety of factors, including the set up of the virtual machine appliance. The appliance controller generates an application package having the determined settings and transmits the package to the application server appliance, wherein the application package is configured to be executed by the runtime environment.

18 Claims, 3 Drawing Sheets

EXECUTION OF AN APPLICATION IN A RUNTIME ENVIRONMENT INSTALLED IN A VIRTUAL APPLIANCE

CROSS-REFERENCE TO RELATED APPLICATION

This application claims the benefit of U.S. Provisional Patent Application Ser. No. 61/576,692, filed Dec. 16, 2011, and entitled "Virtual Machine Appliances for Java Virtual Machines," the entire contents of which are incorporated by reference herein.

BACKGROUND

Virtual computing environments allow multiple virtual machines (VMs) to be run on a single physical platform and to share physical resources. In some virtual computing environments, VMs may be dedicated to executing a runtime environment that provides an application execution framework isolated from the underlying system. The Java Virtual Machine (JVM) is an example of one such runtime environment. JVMs enable a VM to execute one or more server applications independent of the underlying system.

However, for multiple VMs utilized in a large-scale Java application server deployment, the cost of ownership and of maintaining each Java application server, including the traditional guest operating system (OS) running on each VM, may be costly. For example, a typical Java server application requires installation and configuration at a minimum of three levels: guest operating system, JVM/application server, and application. The guest OS not only needs to be installed, patched, and maintained over time, but must be configured with file system, network, and memory settings suitable for running a JVM. For example, memory-intensive applications such as JVMs may operate more efficiently when using guest virtual memory pages of large sizes due to a reduced number of page table lookups needed during execution. As such, a system administrator has to configure the guest OS prior to boot time to enable large-page support at the kernel level. The system administrator may specify further settings, such as the size of each large page, the number of large pages to be used, whether large-pages are reserved in a shared memory region, etc. Security policies in a company may also require considerable configuration of user accounts and network accesses. Additionally, each new VM running an operating system may need to be manually configured with an appropriate network ID (e.g., MAC and/or IP address). Finally, the JVM and application server running thereon need to be configured in a way that is compatible with the setup of the guest system. For example, the guest system may have processors that support memory pages of large sizes (e.g., a large page size of 2MB, in addition to small 4 KB pages) and have large translation lookaside buffers (TLBs) in memory. In another example, the guest system may have a 32-bit or 64-bit based architecture which has requirements in process execution, memory address limitations, etc.

SUMMARY

One or more embodiments of the present invention provide methods, systems, and computer programs for executing application servers on dedicated virtual machines (VMs). An external controller is provided for deploying a reduced-set or "appliance" server configured to execute a Java Virtual Machine. The external controller supplies the appliance server with configurations, settings, and application packages that are needed for the deployment. One advantage of the embodiments of the present invention is that deployments of Java application servers can be carried out quickly and scaled as needed.

A method for provisioning a virtual machine appliance having installed therein a reduced guest operating system, a runtime environment, and a management agent, according to one embodiment, includes the steps of receiving a request to provision the virtual machine appliance, determining, by operation of a processor, one or more settings for the runtime environment and transmitting an application package that is to be executed by the virtual machine appliance using the runtime environment and the settings for the runtime environment to the virtual machine appliance.

A computer system for executing an application, according to one embodiment, includes a runtime environment configured to execute an application package, a reduced guest operating system configured to execute the runtime environment, and a management agent configured to receive, from an appliance controller, the application package and one or more settings for the runtime environment. The management agent is configured to launch the runtime environment based on the one or more settings and provide the runtime environment with the received application package.

A method for executing an application server, according to an embodiment, includes the steps of receiving, from an appliance controller, an application package and one or more settings for executing a runtime environment, and executing the runtime environment based on the one or more settings. The method further includes executing, by operation of a processor, the received application package utilizing the runtime environment.

Further embodiments of the present invention include, without limitation, a non-transitory computer-readable storage medium that includes instructions that enable a processing unit to implement one or more of the methods set forth above or the functions of the computer system set forth above.

DETAILED DESCRIPTION

Figure 1:
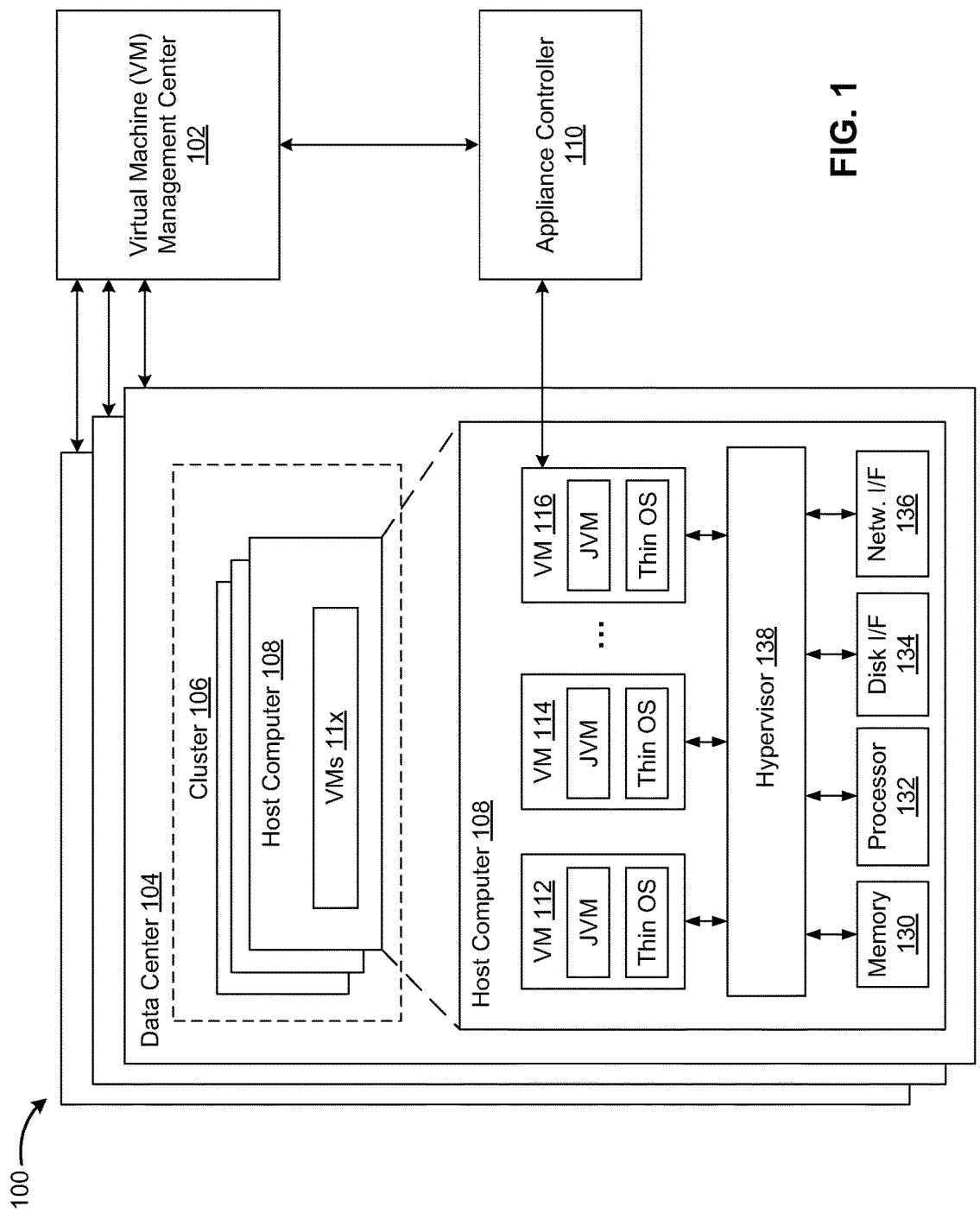
FIG. 1 is a block diagram that illustrates a virtualized computer system with which one or more embodiments of the present invention may be utilized.

FIG. 1 is a block diagram that illustrates a virtualized computer system 100 with which one or more embodiments of the present invention may be utilized. As illustrated, virtualized computer system 100 includes one or more data centers 104, each data center 104 having a plurality of host computers 108. For clarity, only a first data center 104 is shown. Host computers 108 may further be organized into one or more clusters 106. Host computers 108 (also referred to as "servers") are configured to support a virtualized environment and to deliver one or more application services related to information technology, including web services, database services, data processing services, and director services. In the embodiment shown in FIG. 11, host computers 108 are configured to provide Java application server services, as described in detail later.

Each host computer 108 may include conventional components of a computing device, such as memory 130, a processor 132, a disk interface 134, and a network interface 136. Examples of disk interface 134 are a host bus adapter and a network file system interface. An example of network interface 136 is a network adapter, also referred to as a Network interface Card (NIC) In some embodiments, a plurality of NICs is included in network interface 136. Each host computer 108 provides a virtualization layer that abstracts processor, memory, storage, and/or networking resources into multiple virtual machines (VMs) that run concurrently on the same host computer 108.

As shown, one or more VMs are configured within host computer 108, represented in FIG. 1 as VM 112, VM 114, and VM 116, which share the hardware resources of host computer 108. Each VM includes a guest operating system (OS) and one or more guest applications running on top of the guest operating system. In one embodiment, each VM is configured as an "appliance server" that supports a runtime environment, for example a Java Virtual Machine (JVM), as shown in FIG. 1.

The VMs run on top of a software interface layer 138 (referred to herein as a "hypervisor") that enables sharing of the hardware resources of host computer 108 by the VMs. Hypervisor 138 may run on top of the operating system of host computer 108 or directly on hardware components of host computer 108.

Virtualized computer system 100 includes a VM management center 102 that is in communication with each of data centers 104, clusters 106, and host computers 108. VM management center 102 is a computer program that resides and executes in a central server, which may reside in one of data centers 104, or alternatively, running as a VM in one of host computers 108. One example of VM management center 102 is the vCenter® product available from VMware, Inc. VM management center 102 carries out administrative tasks for virtualized computer system 100 including managing data centers 104, managing the VMs running within each host computer 108, provisioning the VMs, migration of VMs from one host computer to another, allocating physical resources, such as processor and memory, load balancing between host computers 108 and clusters 106, and so on. In one embodiment, VM management center 102 may communicate with data center 104 to provision additional VM(s) as an appliance server(s) according to server load/demand at any given time.

Virtualized computer system 100 further includes an appliance controller 110 that is in communication with each VM and with VM management center 102. Appliance controller 110 may direct VM management center 102 to provision an additional VM, for example, using configuration data provided thereto. Appliance controller 110 is further configured to provide applications and/or settings to the resulting VMs for execution. Similar to VM management center 102, appliance controller 110 is a computer program that resides and executes in a central server, which may reside in one of data centers 104, or alternatively, running as a VM in one of host computers 108. While appliance controller 110 is depicted as a separate component from VM management center 102, it is contemplated that appliance controller 110 may be a module or subcomponent of VM management center 102. Appliance controller 110 is described in greater detail in FIG. 2.

Figure 2:
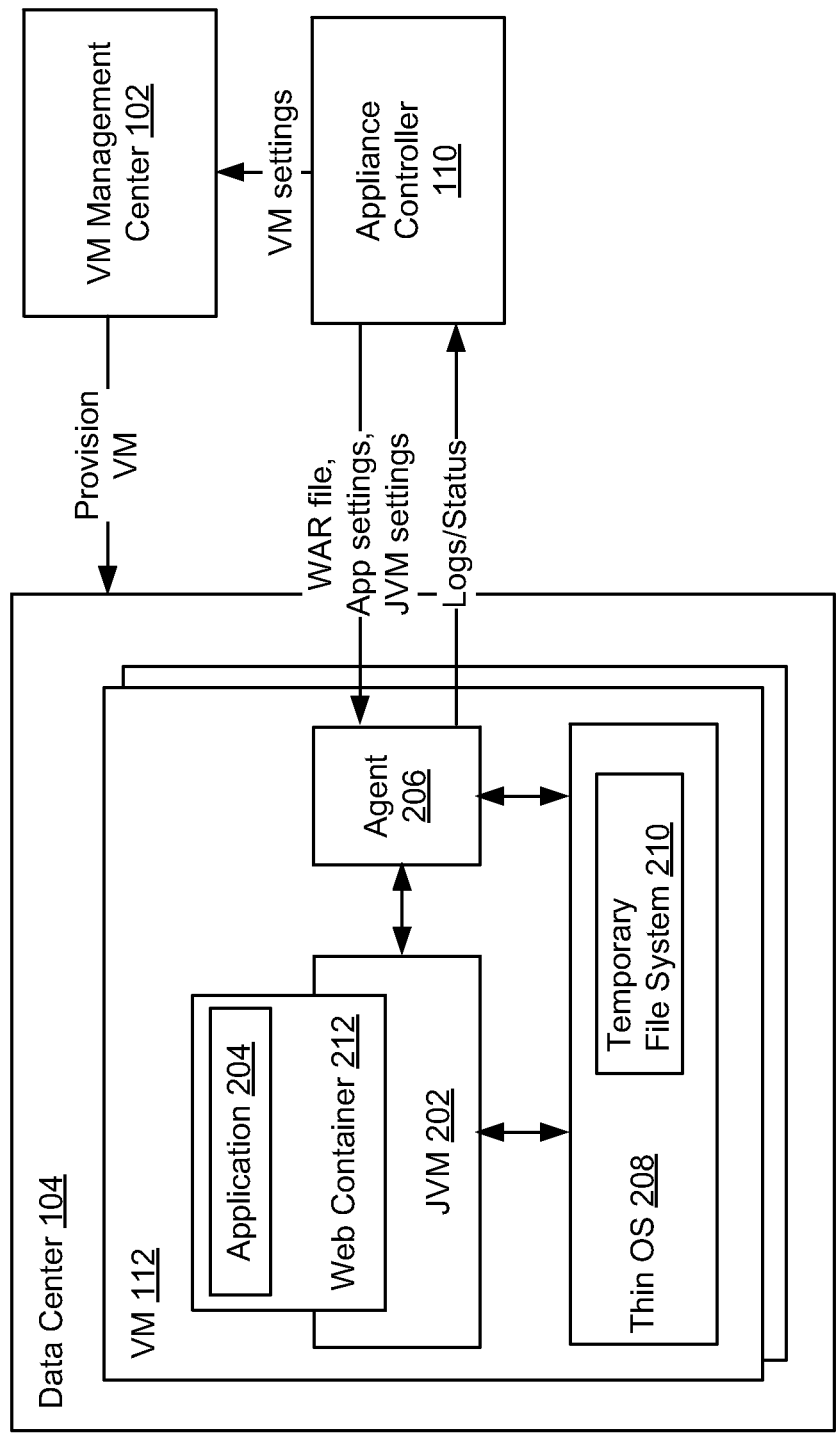
FIG. 2 illustrates the main components of a generalized hosted virtual computer system, according to one embodiment.

In one embodiment, each VM is configured to execute a runtime environment (i.e., a JVM) as an appliance server and is shown in greater detail in FIG. 2. FIG. 2 illustrates various components of VM 112 communicatively connected to an appliance controller 110, according to one embodiment. VM 112 includes a runtime environment 202 configured to execute one or more applications 204 and a management agent 206 that is communicatively connected to appliance controller 110 for receiving applications for execution in runtime environment 202, as well as other commands and settings for runtime environment 202.

In VM 112, the physical system components of a "real" computer are emulated in software, that is, they are virtualized. Thus, VM 112 includes a guest OS 208 and virtualized system hardware, which in turn includes one or more virtual CPUs, virtual system memory, one or more virtual disks, one or more virtual devices, etc., all of which are implemented in software to emulate the corresponding components of an actual computer.

In one embodiment, guest OS 208 is a "reduced" operating system, herein referred to as a "Thin OS," having a subset of functionality of a typical commodity operating system. Thin OS 208 is configured to provide basic essential operating system services sufficient to support execution of runtime environment 202; all other system services are generally disabled. Specifically, the basic services are sufficient to support execution of an interpreter and any supporting class libraries of runtime environment 202. Such operating system services include memory management, process thread management, multitasking, process execution, dynamic linking, hardware hot plug capabilities, multi-user services, etc. Further, application-level services or features of applications including remote access such as telnet, secure shell (SSH), secure copy (SCP), sophisticated logging services, mail daemons, power management daemons, and the runtime environment interface layers such as the Java Native Interface (JNI) feature of the Java runtime environment, may be disabled and/or removed from Thin OS 208.

In one implementation, Thin OS 208 is a version of the Linux operating system with a customized application-level environment, in which case much of the functionality of a multi-process, multi-user OS would be unused. In other implementations, an underlying OS kernel may be specifically tailored towards the use case of executing runtime environment 202 (e.g., Java) and may include specific optimizations for runtime environment 202 (e.g., JVM optimizations) in a specific deployment environment (e.g., in a VM on the VMware vSphere® virtualization platform).

In one embodiment, Thin OS 208 is configured to support execution of management agent 206, described in further detail below. Thin OS 208 limits all inter-process communication (e.g., socket access) from services to just management agent 206. As described above, all network ports may be disabled for additional security, except for a network port used by management agent 206 to communicate with appliance controller 110, and except for any network ports required by runtime environment 202 to communicate with the outside world (e.g., HTTP/HTTPS).

In one embodiment, VM 112 is configured as a generally stateless server having no user-accessible local persistent storage (e.g., only Thin OS 208, runtime environment 202, and management agent 206 are persistently stored). Instead, Thin OS 208 is configured to provide a "temporary" file system layer 210 that preserves system calls and allows runtime environment 202 to perform write operations on a temporary disk. However, once VM 112 shuts down, the contents of the temporary disk are discarded. In one implementation, the temporary storage may be made to memory such that the contents of memory are wiped automatically upon termination of the VM, without any additional intervention by Thin OS 208. Accordingly, VM 112 may be maintained as a stateless "appliance" that may be provisioned and shutdown rapidly without having to maintain state. It is noted that the lack of persistent local storage is generally not a problem for applications being executed by runtime environment 202, as the applications are expected to maintain state using services such as a shared database, as per software development best practices.

Accordingly, the reduced services and stateless nature of Thin OS 208 reduces the cost of ownership of VM 112 and allows multiple VMs running Thin OS 208 to be managed in a highly scalable manner. Further, the stateless nature of Thin OS 208 implies that Thin OS 208 is capable of configuring itself purely with a bundle of configuration data provided by an appliance controller 110.

In one embodiment, VM 112 includes runtime environment 202 running on top of Thin OS 208 and configured to execute one or more applications 204. In one example, runtime environment 202 is a Java Virtual Machine (JVM), and may be interchangeably referred to as a JVM. The JVM may be configured to have a small memory footprint as per memory management techniques disclosed elsewhere (e.g., VMware's Elastic Memory for Java or EM4J) It should be appreciated that embodiments use JVM as an example runtime environment 202, but the same principles can be applied to any application executing on top of Thin OS 208 that provides an application execution environment. The embodiments presented should therefore not be interpreted to be exclusive or limiting, but rather exemplary or illustrative.

In one embodiment, JVM 202 includes a web container 212 that provides a module-based execution layer for executing specially-formatted applications, sometimes referred to as "servlets", such as applications 204. For example, web container 212 may be a JVM servlet container configured to execute Java servlets configured as web applications. In one example, web container 212 is a Java-based web server executing on JVM 202 to process incoming web requests. In another example, web container 212 is a component of a web server that invokes JVM 202 to execute a servlet (e.g., application 204) responsive to received web requests. Other examples of runtime environments 202 and/or web containers 212 suitable for use with embodiments described herein, include Apache Tomcat, JBoss, Eclipse Virgo, and other Open Services Gateway Initiative (OSGi) framework containers.

As will be described in further detail below, applications 204 are provided to JVM 202 from appliance controller 110 via management agent 206. Further, JVM 202 may be dynamically configured based on settings provided by appliance controller 110.

Management agent 206 is an application running on VM 112 that communicates with appliance controller 110 to manage execution of JVM 202 and applications 204. Generally, due to the reduced functionality of Thin OS 208, management agent 206 serves as the primary method of communicating with and managing VM 112. Management agent 206 receives application packages as well as settings for JVM 202 from appliance controller 110. Management agent 206 also handles "boot strap" loading of application 204 in JVM 202 and of JVM 202 itself.

Management agent 206 is configured to monitor JVM 202 and provide JVM log data back to appliance controller 110.

In one embodiment, management agent 206 retrieves the JVM log data and provides the data to appliance controller 110 via, for example, a stream of log records or via shared storage accessible by appliance controller 110. In another embodiment, management agent 206 may function as a proxy for management and/or debugging connections, for example, by forwarding messages via Java Management Extensions (JMX) framework, a Java technology that enables managing and monitoring applications, system objects, and devices, or via messages from Java Debug Wire Protocol (JDWP), a protocol used to communicate between a debugger and JVM 202.

Appliance controller 110 allows a system administrator to centrally manage an application 204 executing on one or more VM(s) and corresponding JVMs 202. In one embodiment, appliance controller 110 is configured to manage deployment of an application 204 at one or more VMs that are managed by VM management center 102. Appliance controller 110 connects to VM 112 via management agent 206 and transmits an application 204 to be executed by the JVM, settings for the JVM itself, and/or VM settings. Appliance controller 110 may receive log files and other status output from JVM 202 via management agent 206 to allow for debugging of JVM 202 and/or debugging of application 204 executing within JVM 202. The log and/or status output may be stored in local persistent storage accessible by appliance controller 110 or may be integrated with storage handled by VM management center 102.

In one embodiment, appliance controller 110 is configured to determine (e.g., auto-configure) settings for a VM and provides those VM settings to VM management center 102. For example, appliance controller 110 may calculate a setting for JVM heap size as a function of guest "physical" memory available to VM 112. Appliance controller 110 may enable or disable features of JVM 202 or VM 112 based on pre-determined rules and/or policies. For example, appliance controller 110 enables a large page setting for JVM 202 in response to determining that guest OS of VM 112 has enabled large page support. In addition, appliance controller 110 may be further configured to determine (e.g., auto-configure) settings for JVM 202. In addition to specifying settings for a VM 112 as well as JVM 202 running in VM 112, in one embodiment, appliance controller 110 may further specify one or more application settings for application 204 to be executed by JVM 202. Appliance controller 110 may modify the JVM and VM settings to increase/decrease resources needed to service requests for the web application.

Figure 3:
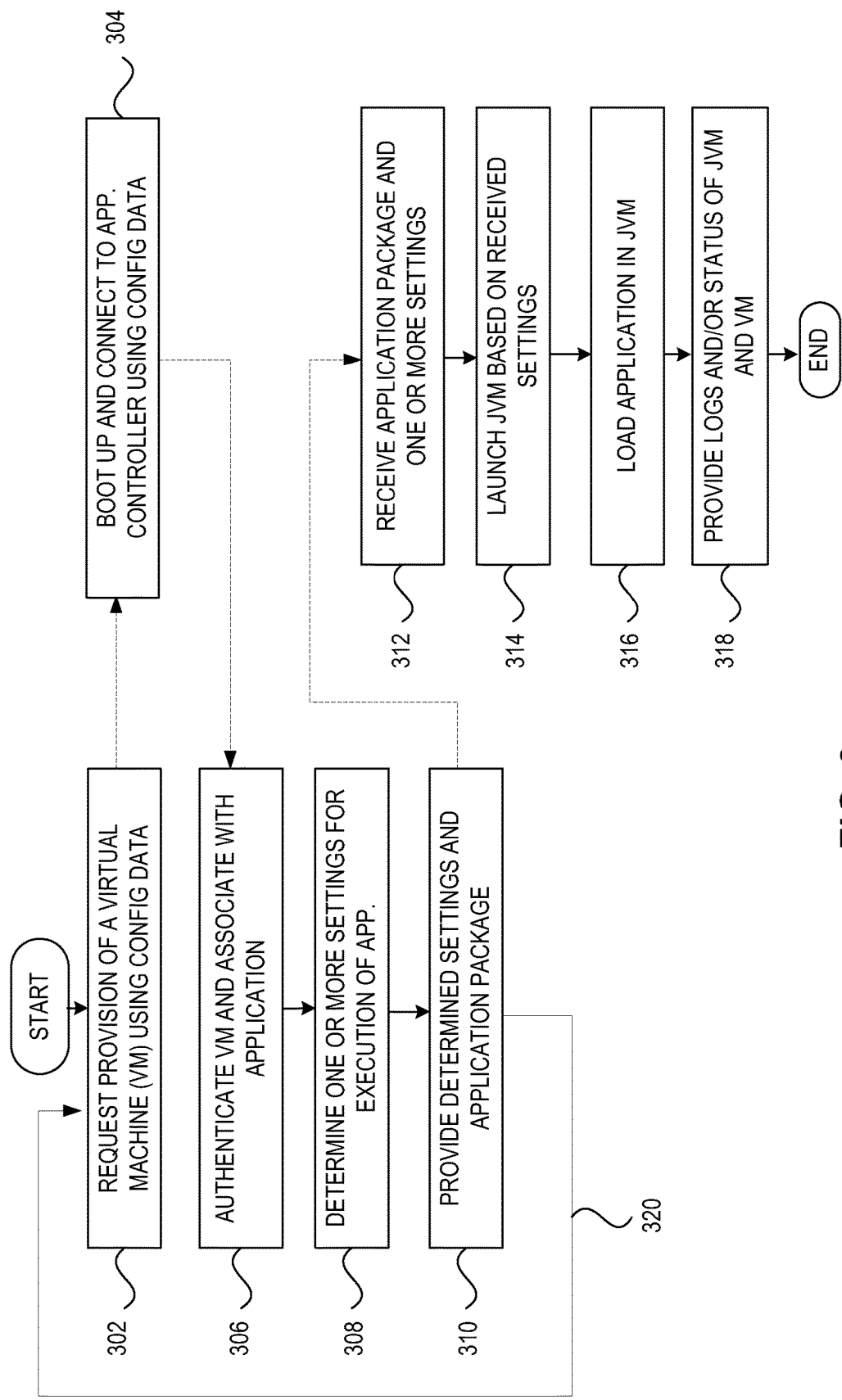
FIG. 3 is a flow diagram that illustrates exemplary steps for a method for managing an application server appliance, according to an embodiment of the present invention.

FIG. 3 is a flow diagram that illustrates exemplary steps for a method for loading an application to be executed by an appliance server, according to an embodiment. According to this embodiment, at step 302, appliance controller 110 determines that resources are needed for servicing one or more web application request(s). Appliance controller 110 may determine resources are needed based on input from a system administrator interacting with appliance controller 110 to deploy and/or launch a web application. In some embodiments, appliance controller 110 may automatically determine that resources are needed by monitoring existing server resources. For example, appliance controller 110 may detect a heightened volume of server traffic and/or client requests that need to be processed. In another example, appliance controller 110 may detect an elevated workload for existing servers processing client requests (e.g., CPU, memory, disk load).

In one embodiment, appliance controller 110 requests VM management center 102 to provision a new VM from available resources based on a configuration data passed to VM management center 102. The configuration data may be configured in a variety of formats, including plaintext files, structure documents, large binary object (e.g., blob), etc. In some embodiments, appliance controller 110 may determine an allocation of resources from system hardware for a new VM based on the requirements and/or performance profile of application 204 to be executed. Example of VM settings that may be determined by appliance controller 110 include the number of CPUs for a VM, memory allocation for the VM, size of memory pages, and other settings.

In one embodiment, the new VM may be created based on a pre-determined disk image having Thin Os 208, JVM 202, web container 212, and management agent 206 already installed thereon. In one embodiment, the new VM represents an appliance server having settings pre-configured such that each appliance server provisioned will always be a predictable state when started. The blob of configuration data may specify one or more VM settings, such as the size of the VM, hardware allocation, network settings, and other settings. The blob of configuration data may also include one or more configurations that will be later used by management agent 206 to locate and connect to appliance controller 110.

At step 304, VM 112 boots up and launches management agent 206. In operation, management agent 206 generally is bootstrapped by the startup of VM 112 and Thin OS 208, whereby management agent 206 performs a handshake operation with appliance controller 110. Management agent 206 utilizes the configuration data supplied by VM management center 102 to contact appliance controller 110. At step 306, appliance controller 110 authenticates the identity of connecting VM 112 by associating the VM with the original request at step 302 made to VM management center 102 to provision a VM. Appliance controller 110 generates and stores an association between VM 112 and application 204. As such, appliance controller 110 may monitor server resources, such as VM 112, that are executing instances of application 204 to determine whether additional or fewer resources may be allocated for execution of application 204.

At step 308, appliance controller 110 determines one or more settings for execution of application 204, including settings for the JVM itself and settings for the application executing therein, according to pre-determined rules and policies. In one embodiment, appliance controller 110 determines (e.g., auto-configures) settings for JVM 202 based on the settings of the provisioned VM and other JVM settings. In some embodiments, appliance controller 110 may determine a heap size for JVM 202 based on a predetermined policy that relates JVM heap size to the capabilities of underlying host computer 108, on the known memory allocation of VM 112 running the JVM, or based on the requirements and/or performance profile of application 204 to be executed. For example, the heap size for the JVM may be configured in view of the guest system's process data model (i.e., 32-bit or 64-bit), available guest virtual memory, and available guest "physical" memory. As such, for 32-bit VMs, the appliance controller may set the JVM heap size to not exceed the maximum guest virtual address size, e.g., 4 GB. Examples of VM settings that may be used by appliance controller 110 include the number of CPUs for the VM, memory allocation for the VM, size of memory pages, and other settings. It should be recognized that the predetermined rules and settings may embody a "best practice" recommended by the providers of the JVM. Accordingly, rather that force system administrations to manually work out JVM settings, embodiments of the present disclosure simplify set-up of VMs and JVMs by providing application logic that determines settings for optimum performance and centrally distributing the auto-configurations to newly provisioned VMs.

In some embodiments, appliance controller 110 may determine garbage collection settings based on the heap size of the JVM. For example, the appliance controller may select different garbage collection policies (e.g., serial collector, throughput collector, concurrent low pause collector) based on the heap size of the JVM, and in some cases, further based on the performance profile of the application running therein. In another example, appliance controller may select heap generation sizes (e.g., young, tenured, permanent) for the JVM based on settings for the underlying VM.

In some embodiments, appliance controller 110 may dynamically re-configure JVM 202 after JVM 202 completes execution and prior JVM 202 beginning execution anew (e.g., between launches), to use an increased heap size based on an indication that VM 112 has received an increased memory allocation.

In one embodiment, appliance controller 110 determines settings for JVM 202 that enables or disables features of JVM 202 to optimize performance of the JVM. In some embodiments, appliance controller 110 may enable (e.g., via configuration setting) "large pages" settings for the runtime environment based on whether the underlying VM 112 utilizes large pages. For example, appliance controller may account for support in VM 112 for large pages by setting a runtime setting (e.g., "-XX:+UseLargePages") for the JVM.

In some embodiments, in addition to specifying settings for a VM 112 as well as JVM 202 naming in VM 112, appliance controller 110 may further specify one or more application settings for application 204 to be executed by JVM 202. The application settings may include one or more configurations to setup application 204, such as account login information, host names, network addresses, etc. Appliance controller 110 may further retrieve pre-determined settings and/or configuration data for application 204, such as a predetermined network address and login credentials for shared services (e.g., database, shared storage).

At step 310, appliance controller 110 may now deploy application-level data. and one or more settings to VM 112 via management agent 206 running on VM 112. Application 204 may be packaged in a format, such as Web application ARchive (WAR) file format that contains, in a single package, application data files and configuration files/settings needed to execute the web application. In one embodiment, all configuration state for the application is packaged with the application and as such, is immediately scalable to any number of appliances.

At step 312, management agent 206 receives an application package and one or more configurations and/or settings for JVM 202 from appliance controller 110. In one embodiment, management agent 206 receives the WAR file over along with any configurations needed for execution of the deployed application and configurations to set up JVM 202. At step 314, management agent 206 launches JVM 202 utilizing configurations and/or settings provided by or based on parameters from appliance controller 110. Management agent 206 may modify the settings by taking into consideration the properties of the VM that the JVM is running in (e.g., memory allocation, number of CPUs etc).

At step 316, management agent 206 loads application 204 (e.g., WAR file) along with the configuration files necessary for application 204 into JVM 202. JVM 202 executes application 204 to handle one or more incoming web application requests. In one embodiment, management agent 206 may provide application 204 to web container 212 (i.e., servlet container). In one embodiment, application 204, to be fully portable, may have its configuration data packaged into the received WAR file. However, in some cases, a web application may expect to load configuration or data from a local file system. If so, then this loading process is manually set up and configured before the application initializes. This loading process may include copying the appropriate files or pointing the application to shared storage. In one embodiment, appliance controller 110 provides data (e,g., application package) to an external storage (e.g., http-accessible storage, "blob store") which may be accessed by management agent 206 as needed to retrieve the application package and other data. In some embodiments, appliance controller 110 may provide a file system configuration to management agent 206, which makes a file system available to the application automatically as a read-only storage.

At step 318, responsive to loading application 204, management agent 206 communicates status (e.g., success, failure) back to appliance controller 110. The communicated status may include one or more log records generated by execution of application 204 at VM 112. For example, log data from JVM 202 and web container 212 may be routed through management agent 206 via HTTP to an area of shared storage managed by appliance controller 110. Appliance controller 110 may maintain this log data to ensure that the recent logs persist beyond the lifespan of VM 112 and are available for later debugging and/or performance analysis. The method for loading an application to be executed, as described above, may be repeated to provision additional VMs and JVMs as needed by demand and/or server load, as illustrated by loop 320.

Embodiments may advantageously reduce installation and configuration cost of deploying a Java server application. The techniques herein can eliminate installation and configuration costs previously discussed. Embodiments reduce not only the one-time installation cost of setting up a VM initially, but also reduce the cost of maintaining the VMs by being automatically tolerant of ongoing changes. For example, if a system administrator decides to resize or reconfigure the VM, embodiments may permit many static options (such as the number of large pages and shared memory) to be reconfigured automatically, rather than being done manually for every change. Additionally, embodiments may enable each new VM running an operating system to be automatically configured with appropriate network settings (such as MAC address, IP address, domain, etc.), rather than having to manually configure each one. In another example, if there any changes to the VM, embodiments may enable automatic re-configuration of any static settings to the application server and the JVM (e.g., large pages, heap sizing) that are appropriate to the setup of the operating system, rather than having to manually reset the static configurations.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may all within the scope of the appended claims(s).

What is claimed is:

1. A method for executing an application in a runtime environment, the method comprising:
 receiving, at a processor, a request to provision a virtual appliance having installed therein a guest operating system and the runtime environment, which provides an application execution framework isolated from the guest operating system;

generating, by operation of the processor, an application package comprising an application configured to be executed within the runtime environment and one or more settings of the runtime environment that control operation of the runtime environment, the one or more settings including a garbage collection policy for the runtime environment based on an amount of guest physical memory allocated to a heap for the runtime environment; and transmitting, from the processor to the virtual appliance, the application package that is to be executed by the virtual appliance in the runtime environment and using the settings for the runtime environment.

2. The method of claim 1, further comprising:
determining the one or more settings of the runtime environment that control operation of the runtime environment based on computing resources allocated to the virtual appliance.

3. The method of claim 2, wherein the determining the one or more settings of the runtime environment that control operation of the runtime environment further comprises:
determining a heap size for the runtime environment based on an amount of guest physical memory allocated to the virtual appliance.

4. The method of claim 1, further comprising:
receiving, from the virtual appliance, a status message comprised of log data generated during execution of the application within the runtime environment.

5. The method of claim 1,
wherein the guest operating system includes a plurality of system services, and
wherein all of the system services are disabled except for a subset of the plurality of system services sufficient to support execution of the runtime environment.

6. The method of claim 1,
wherein the guest operating system includes a temporary file system layer configured to receive write operations from the runtime environment, and
wherein contents of the temporary file system layer are discarded upon termination of the runtime environment.

7. A non-transitory computer-readable storage medium comprising instructions that, when executed in a computing device, execute an application in a runtime environment by performing the steps of:
receiving, at a processor, a request to provision a virtual appliance having installed therein a guest operating system and the runtime environment, which provides an application execution framework isolated from the guest operating system;
generating, by operation of the processor, an application package comprising an application configured to be executed in the runtime environment and using one or more settings of the runtime environment that control operation of the runtime environment, the one or more settings including a garbage collection policy for the runtime environment based on an amount of guest physical memory allocated to a heap for the runtime environment; and
transmitting, from the processor to the virtual appliance, the application package that is to be executed by the virtual appliance using the runtime environment and the settings for the runtime environment.

8. The non-transitory computer-readable storage medium of claim 7, further comprising instructions for:
determining the one or more settings of the runtime environment that control operation of the runtime environment based on computing resources allocated to the virtual appliance.

9. The non-transitory computer-readable storage medium of claim 8, wherein the instructions for determining the one or more settings of the runtime environment that control operation of the runtime environment further comprises instructions for:
determining a heap size for the runtime environment based on an amount of guest physical memory allocated to the virtual appliance.

10. The non-transitory computer-readable storage medium of claim 7, further comprising instructions for:
receiving, from the virtual appliance, a status message comprised of log data generated during execution of the application within the runtime environment.

11. The non-transitory computer-readable storage medium of claim 7,
wherein the guest operating system includes a plurality of system services, and
wherein all of the system services are disabled except for a subset of the plurality of system services sufficient to support execution of the runtime environment.

12. The non-transitory computer-readable storage medium of claim 7,
wherein the guest operating system includes a temporary file system layer configured to receive write operations from the runtime environment, and
wherein contents of the temporary file system layer are discarded upon termination of the runtime environment.

13. A computer system for executing an application in a runtime environment, the computer system comprising a system memory and a processor programmed to carry out the steps of:
receiving, at the processor, a request to provision a virtual appliance having installed therein a guest operating system and a runtime environment, which provides an application execution framework isolated from the guest operating system;
generating, by operation of the processor, an application package comprising an application configured to be executed within the runtime environment and one or more settings of the runtime environment that control operation of the runtime environment, the one or more settings including a garbage collection policy for the runtime environment based on an amount of quest physical memory allocated to a heap for the runtime environment; and
transmitting, from the processor to the virtual appliance, the application package that is to be executed by the virtual appliance in the runtime environment and using the settings for the runtime environment.

14. The computer system of claim 13, wherein the processor is further programmed to carry out the steps of:
determining the one or more settings of the runtime environment that control operation of the runtime environment based on computing resources allocated to the virtual appliance.

15. The computer system of claim 14, wherein the processor is further programmed to carry out the steps of:
determining a heap size for the runtime environment based on an amount of guest physical memory allocated to the virtual appliance.

16. The computer system of claim 13, wherein the processor is further programmed to carry out the steps of:

receiving, from the virtual appliance, a status message comprised of log data generated during execution of the application within the runtime environment.

17. The computer system of claim 13, wherein the guest operating system includes a plurality of system services, and
wherein all of the system services are disabled except for a subset of the plurality of system services sufficient to support execution of the runtime environment.

18. The computer system of claim 13, wherein the guest operating system includes a temporary file system layer configured to receive write operations from the runtime environment, and
  wherein contents of the temporary file system layer are discarded upon termination of the runtime environment.

* * * * *